Dec. 19, 1933.  A. E. JONES  1,940,499
GYROSCOPE
Filed March 15, 1929  2 Sheets-Sheet 1
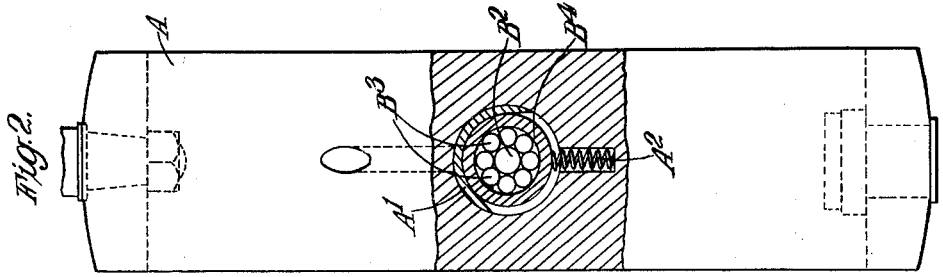
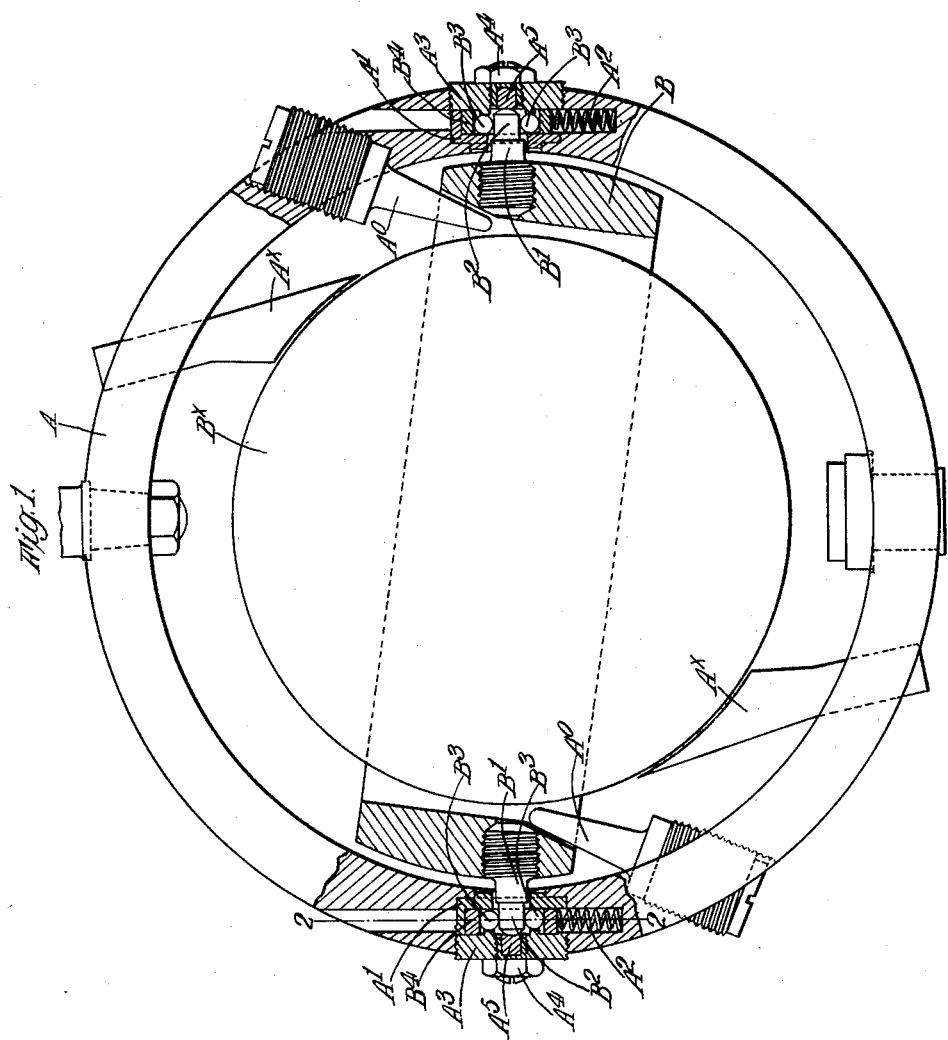

Dec. 19, 1933.     A. E. JONES     1,940,499
GYROSCOPE
Filed March 15, 1929      2 Sheets-Sheet 2
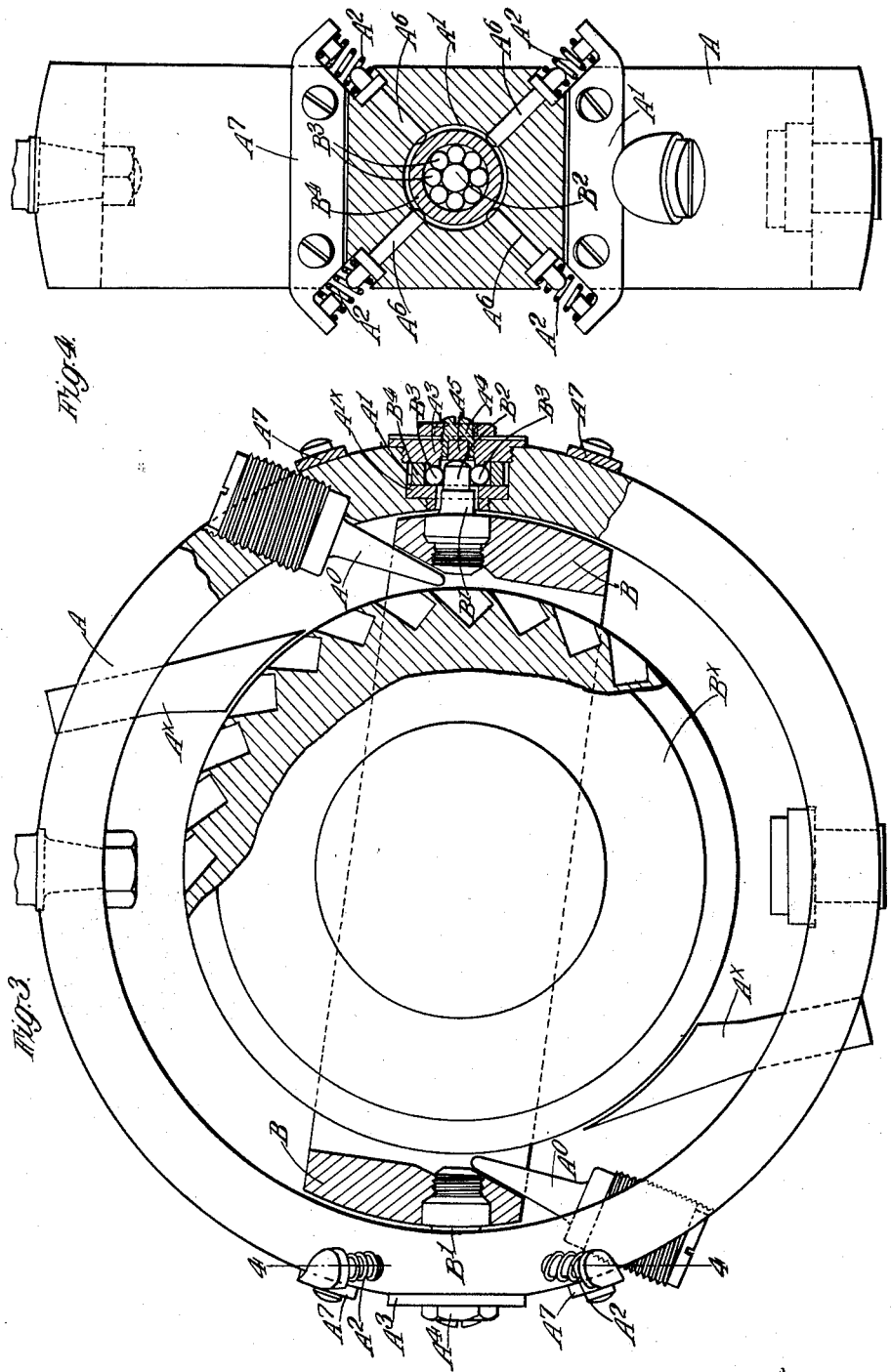

Patented Dec. 19, 1933

1,940,499

UNITED STATES PATENT OFFICE 1,940,499

GYROSCOPE

Albert Edward Jones, Westminster, England, assignor to The Whitehead Torpedo Company, Limited, Westminster, England, a British company Application March 15, 1929, Serial No. 347,301, and in Great Britain March 22, 1928

3 Claims. (Cl. 308—184)

This invention relates to gyroscopes, particularly the controlling gyroscopes of automobile torpedoes, and has for its chief object to provide an improved suspension for the inner or horizontal gimbal ring.

According to the invention each of the pivot pins or trunnions of the inner or horizontal gimbal ring is composed of, or formed with, a plain cylindrical portion supported on balls which work in a ball race having a plain cylindrical bore. Owing to this formation of the surfaces with which the balls are in contact, friction is considerably reduced as there is no possibility of the slight jambing which occurs under the influence of sidewise movements of the horizontal gimbal ring when the balls are disposed in the usual curved recesses. The balls in the present invention are not subjected to sidewise pressure, the sidewise movement of the horizontal gimbal ring being prevented by independent devices of an anti-frictional nature which are carried by parts of the outer or vertical ring and bear against the ends of the pivot pins. The ball races may be resiliently mounted in housings in such a manner that they can move with the horizontal gimbal ring in planes at right angles to the axis of the pivot pins under the influence of shocks to which the gyroscope may be subjected. The said movements of the horizontal gimbal ring may be restricted by means of suitable stops which may conveniently be constituted by the walls of holes in the housings or other parts carried by the outer or vertical gimbal ring, the said holes receiving, with a small amount of clearance, large diameter portions of the pins, which portions thus take the shock when they come into contact with the walls of the holes.

In order that the said invention may be clearly understood and readily carried into effect, the same will now be described more fully with reference to the accompanying drawings, in which:—

Figure 1 is a sectional end elevation showing one constructional form of the improvements, Figure 2 is a section taken approximately on the line 2, 2 of Figure 1.

Figure 3 is a view similar to Figure 1 showing another constructional form of the improvements, and Figure 4 is a section taken approximately on the line 4, 4 of Figure 3.

A is the outer or vertical gimbal ring and B is the inner or horizontal gimbal ring carrying the flywheel $B^x$ and provided with pivot pins or trunnions $B^1$. The rotation of the flywheel is started by air under pressure issuing from the nozzles $A^x$ and rotation is maintained by air under pressure issuing from the smaller nozzles $A^0$ as is well understood. The outer ends of the said pivot pins are reduced in diameter as shown in Figures 1 and 3 to form plain cylindrical parts $B^2$ as shown. Arranged in contact with each of the said cylindrical parts $B^2$ and also in contact with each other are balls $B^3$ which are disposed in a single ring. The said balls are also arranged in contact with the plain cylindrical bore of a surrounding ball race $B^4$ which is mounted in a housing $A^1$ carried by the outer gimbal ring A so that the said ball race can move in a plane at right angles to the axis of the pivot pin against the action of one or more springs $A^2$ carried by the outer gimbal ring A. Each housing is held in position by a screwed cap $A^3$ and the balls $B^3$ are held in place laterally by part of this cap and by part of said housing $A^1$, but they are allowed a slight amount of lateral play between these parts. The inner portions of the pivot pins $B^1$ where they are left of relatively large diameter are disposed with a certain amount of clearance as shown in Figures 1 and 3 in holes in the housings $A^1$ so as to permit slight movements of the ball races $B^4$ to occur under the influence of shocks. When a shock occurs the ball races $B^4$ move against the resistance of their springs $A^2$ until the large diameter portions of the pivot pins $B^1$ bear against the walls of the said holes so that these large diameter portions then take the shock.

In the construction according to Figures 1 and 2, which represents a construction suitable for the controlling gyroscope of an automobile torpedo, the ball races $B^4$ normally rest in contact at their upper and rear parts with the aforesaid housings $A^1$ which are cut away at their lower and forward parts as shown in Figure 2 and a single spring $A^2$ is disposed in a hole in the outer gimbal ring A beneath each ball race so as normally to hold the latter in contact with its housing. Thus when shock occurs on the entry of the torpedo into the water in a downward and forward direction the ball races $B^4$ are free to move slightly in a downward and forward direction until the large parts of the pivot pins $B^1$ bear against the walls of the holes in which they are disposed. The said ball races are afterwards returned to their normal position under the action of the springs $A^2$. In some cases it may be desirable to cut away the rear parts of the housings $A^1$ also so as to allow for any rearward movement that may take place due to the shock of discharge of the torpedo from its launching tube.

Each of the aforesaid caps $A^3$ is provided with a small screw threaded plug $A^4$ carrying in a central position a cylindrical piece $A^5$ against which the rounded end of the pivot pin bears, this arrangement providing an anti-friction device for holding the horizontal gimbal ring against sidewise movement.

In cases where the gyroscope is likely to be subjected to shocks in any direction the ball races are resiliently mounted so that they can move in any direction at right angles to the axes of the pivot pins. A constructional form of an arrangement of this character is shown in Figures 3 and 4 in which each of the ball races is placed under the influence of four spring plungers $A^6$ carried by the outer gimbal ring A and arranged at equal angles apart (preferably at 45° to the horizontal and vertical planes as shown in Figure 4), the said plungers when in their innermost position bearing against stops or shoulders in the outer gimbal ring. The housings $A^1$ for the races are, in this construction, constituted by recesses in the outer or vertical gimbal ring A, and plates $A^{1x}$ carried by this ring are formed with holes in which the large diameter portions of the pivot pins are disposed with a certain amount of clearance for the purpose above described. The springs $A^2$ of the said plungers $A^6$ are preferably supported at their outer ends by the ends of cross members $A^7$ connected to the outer gimbal ring A as shown in Figure 4. The said spring plungers have the effect of permitting the ball races $B^4$ to move slightly in any direction at right angles to the axes of the pivot pins and of returning the ball races to their original position when the shock to which the gyroscope is subjected has ceased. Alternatively there may be interposed between each of the ball races $B^4$ and its housing $A^1$ a ring of rubber, leather or other suitable resilient material which will allow the ball races to move as stated above and will return them to the original position when the shock has ceased.

What I claim and desire to secure by Letters Patent of the United States is:—

1. In a bearing for gyroscope gimbal rings having pivot pins, ball race rings and means for resiliently mounting the race rings to permit movement of the pivot pins at right angles to the axis thereof to thereby take up shocks coming on the gyroscope, said means comprising a plurality of spring pressed plungers mounted in the outer ring and extended into supporting relation with the ball race ring, and means for limiting the said right angle and the said longitudinal movement of the pivot pins, said means taking all undue shocks solidly before they are transmitted to the balls.

2. In a bearing for gyroscope gimbal rings having pivot pins, ball race rings and means for resiliently mounting the race rings to permit movement of the pivot pins at right angles to the axis thereof to thereby take up shocks coming on the gyroscope, said means comprising a recess in the outer ring into which the ball race is received, a plurality of spring pressed plungers mounted in the outer ring and extending into said recess, said plungers being arranged to support the ball race a spaced-distance from the interior wall of said races, stops for limiting the movement of the plungers in their longitudinal direction, and means for limiting the said right angle and the said longitudinal movement of the pivot pins, said means taking all undue shocks solidly before they are transmitted to the balls.

3. A suspension for the inner gimbal ring of a gyroscope, also having an inner gimbal ring, comprising pivot pins having a portion formed with a cylindrical surface, a plurality of balls supported in the outer gimbal ring, a ball race therefor therein, said ball-race having a smooth, plain, perfectly cylindrical inner surface in contact with said balls and said balls always contacting only the said cylindrical surface of said pivot pin and on a contact circle removed from the outer end of said cylindrical surface, means for resiliently mounting the ball races to permit movement of the pivot pins at right angles to the axis thereof under the influence of shocks, said means comprising a plurality of spring-pressed plungers mounted in the outer gimbal rings and extended into supporting relationship with the ball races, and stops co-operating with said pins to limit the said movement thereof.

ALBERT EDWARD JONES.